United States Patent [19]

Canter et al.

[11] Patent Number: 4,668,049
[45] Date of Patent: May 26, 1987

[54] ILLUMINATION FOR A SCATTERING TYPE LIQUID CRYSTAL DISPLAY

[75] Inventors: Stanley Canter, Phoenix; Paul A. Warg, Mesa; Forrest E. Brooks, Tempe, all of Ariz.

[73] Assignee: ITT Corporation, New York, N.Y.

[21] Appl. No.: 683,091

[22] Filed: Dec. 18, 1984

[51] Int. Cl.⁴ ............................................. G02F 1/13
[52] U.S. Cl. ................................. 350/345; 350/339 F
[58] Field of Search .................. 350/401, 345, 347 V, 350/350 S; 358/56, 59, 61, 226, 234; 340/716, 717, 713, 795, 784, 807, 810, 781; 362/32, 294, 97; 313/484, 487, 491, 584

[56] References Cited

U.S. PATENT DOCUMENTS

| | | | |
|---|---|---|---|
| 2,957,940 | 10/1960 | Cusano | 358/59 |
| 3,563,138 | 4/1972 | Cooper | 350/345 X |
| 3,752,974 | 8/1973 | Baker et al. | 362/31 |
| 3,892,998 | 7/1975 | Tsui et al. | 313/487 |
| 4,071,883 | 1/1978 | Dennis | 362/97 |
| 4,233,493 | 11/1980 | Nath | 362/32 X |
| 4,384,764 | 5/1983 | Tischer et al. | 350/345 |
| 4,548,474 | 10/1985 | Nagae | 350/333 |

FOREIGN PATENT DOCUMENTS

| | | | |
|---|---|---|---|
| 0072199 | 6/1977 | Japan | 340/795 |
| 83/03013 | 9/1983 | PCT Int'l Appl. | 350/345 |
| 2120396 | 11/1983 | United Kingdom | 350/350 S |

*Primary Examiner*—John K. Corbin
*Assistant Examiner*—David Lewis
*Attorney, Agent, or Firm*—T. L. Peterson; J. M. May

[57] ABSTRACT

A flat panel liquid crystal display for use in providing single or multi-color display images. The display comprises one or more ultraviolet light sources, a light pipe assembly which includes a plurality of liquid crystal cells that may be addressed via an array of transparent row and column electrodes, and a viewing screen having a plurality of phosphor elements that are located in close proximity and in registry with respective liquid crystal cells. Those phosphor elements and only those phosphor elements that are associated with liquid crystal cells that are in their scattering states are illuminated to form the image to be displayed.

14 Claims, 8 Drawing Figures

FIG. 4a $$(1) n_{21} = \frac{\sin \theta_1}{\sin \theta_2}$$

ILLUMINATION FOR A SCATTERING TYPE LIQUID CRYSTAL DISPLAY

BACKGROUND OF THE INVENTION

The present invention relates to flat panel liquid crystal displays, and is directed more particularly to flat panel liquid crystal displays which utilize ultraviolet light to controllably illuminate an array of single or multi colored phosphor elements.

In attempting to produce displays which are less bulky than cathode ray tube type displays, a number of types of flat panel displays have been developed. One of these, known as a gas discharge type display, makes use of an array of phosphor elements which are individually addressed by an array of orthogonally disposed anode and cathode electrodes. One display of this type is described in U.S. Pat. No. 4,031,541, which issued in the name of Arisawa et al. on June 21, 1977.

Another type of flat panel display makes use of an array of colored strips which are aligned with the picture elements of a liquid crystal display. In displays of this type, the picture elements are addressed by controllably actuating the electrodes of the liquid crystal cells, thereby allowing light which is transmitted through or reflected from the cells to take on the color of the colored strips. One display of the latter type is described in U.S. Pat. No. 4,410,887, which issued in the name of Stolov et al. on Oct. 18, 1983.

Still another type of flat panel display makes use of a fluorescent plate which is located behind a liquid crystal display panel. In displays of this type, the switching of the liquid crystal cells makes selected parts of the fluorescent plate visible therethrough. One display of the latter type is described in U.S. Pat. No. 4,167,307, which issued in the name of Cirkler et al. on Sept. 11, 1979.

A still further type of flat panel display makes use of internally reflected visible light and a scattering type liquid crystal cell, but lacks a fluorescent viewing plate. One display of this type is described in copending application Ser. No. 605,508, filed Apr. 30, 1984, now U.S. Pat. No. 4,626,074 which application is owned by the assignee of the present invention.

Each of the above described types of displays has certain deficiencies which limit the usefulness thereof. Many displays of the above described types, for example, produce visible picture elements only during those times when the electrodes associated therewith are energized. Because all but very small displays will include hundreds of rows of such picture elements, the control circuitry of the display must include refresh circuitry for energizing each picture element at a relatively rapid rate, such as thirty times per second. Even with such refreshing, however, the fraction of the time that each picture element spends in its energized state is inversely proportional to the number of rows in the display. As a result, displays of the above described types often produce images which are relatively dim or have low contrast ratios.

SUMMARY OF THE INVENTION

In accordance with the present invention, there is provided an improved flat panel liquid crystal display which is not subject to the above described deficiencies and which produces a relatively bright image having a high contrast ratio.

Generally speaking, the display of the invention includes an ultraviolet (UV) light source, a UV light pipe assembly which includes a layer of liquid crystal material, and an array of phosphor elements of single or multiple colors which are illuminated by UV light that is transmitted through the liquid crystal material of the light pipe assembly. The display of the invention also includes a plurality of transparent column and row electrodes which are supported on opposite sides of the liquid crystal layer. Finally, the display of the invention includes driving circuitry for causing the volumes of liquid crystal material that lie between the column and row electrodes to assume either a clear state in which UV light is transmitted in a substantially non-scattered form, or a scattering state in which UV light is transmitted in substantially scattered form. Advantageously, UV light which is transmitted in scattered form causes the associated phosphor elements to be brightly illuminated, while UV light which is transmitted in non-scattered form allows the associated phosphor elements to remain dark. As a result, the display of the invention produces a bright image having a high contrast ratio.

In the preferred embodiment, the liquid crystal material used in the light pipe assembly of the invention is one which exhibits a storage characteristic in both its clear and its scattering states. One such liquid crystal material is a smectic A material with a positive dielectric anisotropy such as 4-cyano-4'-n-octyl biphenyl. With the latter material, the phosphor elements may be maintained in a continuously bright or continuously dark state between successive addressings of the rows and columns of the display. This continuity of states, in turn, further increases the apparent brightness of the display.

DESCRIPTION OF THE DRAWINGS

Other objects and advantages of the invention will be apparent from the following description and drawings in which.

DESCRIPTION OF THE PREFERRED EMBODIMENTS

Figure 1:
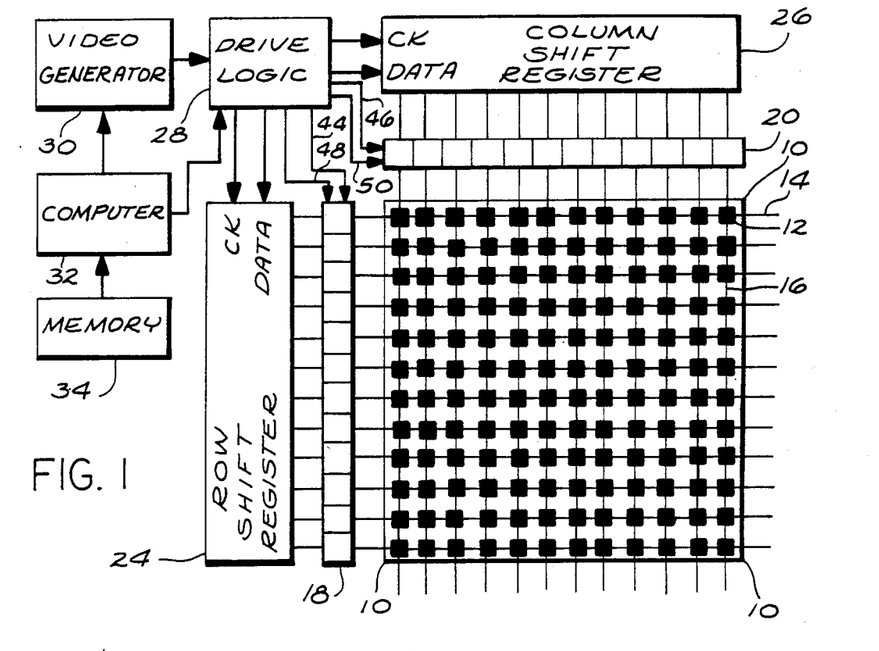
FIG. 1 is a simplified front view of one embodiment of the display of the present invention, together with a block diagram of the drive circuitry therefor.

Referring to FIG. 1 there is shown a simplified mechanical and electrical block diagram of one embodiment of a display system which has been constructed in accordance with the present invention. This display system includes a display panel 10, the physical structure of which will be described more fully presently in connection with FIGS. 2, 3, and 5A through 5C. The display system of FIG. 1, also includes an array of picture elements or pixels such as 12 which are arranged in rows and columns. Each of these picture elements is located in close proximity to the region of space, known as a cell, which lies between the intersection of a respective row conductor such as 14 and a respective column conductor such as 16. These conductors preferably comprise transparent strips of a conductive material, such as indium-tin oxide, which are deposited on respective, closely-spaced internal surfaces of the display panel. The space between these conductors and their associated supporting surfaces is filled by a suitable liquid crystal material, the optical state of which may be controlled by controlling the voltages that are applied to the row and column conductors. While only 12 rows and 12 columns are shown in the display of FIG. 1, it will be understood that the actual number of rows and columns will be very much larger than 12 and that the present invention is not limited to any particular number of row and/or column conductors.

The potentials of row conductors 14 of FIG. 1 are controlled by a plurality of respective row driver circuits 18. Each of these driver circuits serves to apply to the respective row conductor one of two square wave voltages, one voltage being associated with the writing of data into the cells of that row and the other being associated with the erasure of data from the cells of that row. Each driver circuit is also adapted to apply ground potential to a row conductor when the cells of that row are neither being written or erased.

Similarly, the potentials of column conductors 16 of FIG. 1 are controlled by a plurality of respective column driver circuits 20. These driver circuits also supply to the respective column conductors one of two square wave voltages, one voltage being associated with the writing of data into the cells of that column, and the other being associated with the erasure of data from the cells of that column.

The magnitudes and frequencies of the square wave voltages applied by the row and column drivers may be as set forth in U.S. Pat. No. 4,139,273, which issued in the name of Crossland et al. on Feb. 13, 1979 and which is hereby expressly incorporated herein by reference. It will be understood, however, that the present invention is not limited to use with drive voltages having any particular magnitude, waveshape or frequency.

In the preferred embodiment, the liquid crystal material which fills the spaces between the row and column conductors comprises a smectic A material which has a positive dielectric anisotropy, such as 4-cyano-4'-n-octyl biphenyl. Liquid crystal materials of the latter type are desirable because they exhibit two optical states, both of which can be established electrically and both of which, once established, can be maintained substantially indefinitely without the further application of electrical power. In a first, clear state the molecules of this liquid crystal material align themselves in a linear configuration which allows light to pass therethrough without being scattered. In a second, scattered state the molecules of this material assume an irregular configuration which causes light passing therethrough to be scattered. During the establishment of the scattering state, the scattering effect is produced by the turbulent motion of the molecules that is caused by the presence of scattering voltages between the row and column conductors. Even after the latter voltages are removed, however, the scattering state is maintained as the liquid crystal molecules settle into a static configuration that is characterized by small focal-conic molecular domains. These optical states and the row and column voltages necessary to establish the same are further described in the above mentioned Crossland patent.

In operation, the liquid crystal cells are driven into the states necessary to produce the desired image on a row-by-row basis. More particularly, the cells of a complete row are first driven into their scattering states by applying the row scattering voltage to the row conductor and by applying the column scattering voltage to all of the column conductors. Once all the cells of a row have been scattered, selected ones of the cells are cleared to form one line of the image which is to be displayed. This is accomplished by applying the row clearing voltage to the row conductor and by applying the column clearing voltage to only those column conductors which are associated with the cells to be cleared.

Once a row has been scattered and then selectively cleared in the above manner, the process is repeated for each row in succession until all of the cells have been driven into the states necessary to establish the complete image on the display. Once established, the complete image will remain substantially indefinitely without the application of further voltages to the row or column conductors. If the image presented on the display does change, the image may be updated by repeating the above described scattering and clearing process either for the display as a whole or for only those rows of the display which contain data that must be changed.

To the end that the row and column drivers may drive the row and column conductors in the above described manner, the drive circuitry of FIG. 1 includes a row shift register 24, a column shift register 26, a drive logic unit 28, a video generator 30, a computer 32 and a memory 34. In operation, memory 34 stores data that defines the image to be presented on display 10. When this image is ready for presentation, computer 32 causes this data to be transmitted to video generator 30 for serialization and application to the display. At the same time, computer 32 causes drive logic unit 28 to load the data necessary to generate successive lines of display into row and column shift registers 24 and 26.

Assuming, for example, that the portion of the image that is associated with row 14 is being presented, computer 32 will cause drive logic unit 28 to load into row shift register 24 a sequence of bits which forces the row driver that is connected to row conductor 14 to apply a scattering voltage thereto. The computer will also cause drive logic unit 28 to load into column shift register 26 a sequence of bits which will force all of the column drivers to apply scattering voltages thereto. Once all the cells of row 14 of the display have been scattered, computer 32 will cause drive logic unit 28 to selectively clear the cells of row 14. This is accomplished by causing the row driver of row 14 to apply a clearing voltage thereto, and by loading column shift register 26 with a sequence of bits which will cause clearing voltages to be applied to only those cells of row 14 that are to be cleared. Once these operations have been completed, computer 32 will cause drive logic 28 to repeat the scattering and clearing operations for each of the other rows of the display.

During the times that bits are being shifted through shift registers 24 and 26, drive logic unit 28 disables row drivers 18 and column drivers 20 via enable lines 44 and 46 to prevent transient data from appearing on the display. At the same time, drive logic 28 selects the voltages that will be produced by row drivers 18 and column drivers 20 by applying suitable state determining voltages thereto via control lines 48 and 50. Because the circuitry used in drive logic unit 28 and row and column drivers 18 and 20 does not form a part of the present invention, this circuitry will not be described in detail herein.

Figure 2:
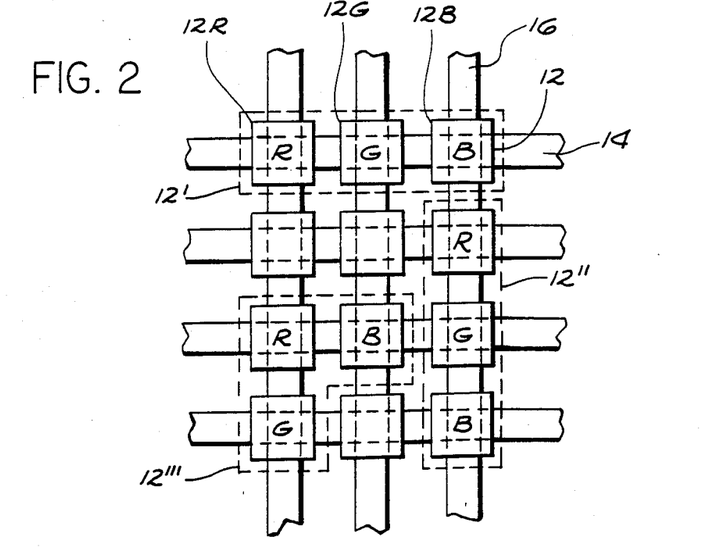
FIG. 2 is a simplified, enlarged fragmentary view of the row and column conductors of the display of FIG. 1, together with their associated phosphor elements.

Referring to FIG. 2, there is shown an enlarged fragmentary front view of the display panel of FIG. 1, like elements being similarly numbered in FIGS. 1 and 2. In FIG. 2 the row conductors such as 14 and the column conductors such as 16 have relative widths and spacings which are representative of the many possible relative widths and spacings which may be used in practicing the present invention. As explained earlier, these row and column conductors are preferably composed of a suitable transparent conductive material, such as indium-tin oxide, which has been deposited on a pair of closely-spaced parallel transparent plates. The space between these electrodes and their supporting plates is preferably filled with a layer of a smectic A liquid crystal material having a thickness of approximately 15 to 30 microns, the parts of this layer that lie between each row electrode and the adjacent overlying column electrodes defining the previously mentioned liquid crystal cells. For the sake of convenience, these cells will hereinafter be referred to as lying at the intersections of the row and column electrodes even though the row and column electrodes do not actually intersect one another.

In the embodiment of FIG. 2, the picture elements 12 of the display include one or more phosphor elements for emitting visible light in response to illumination by UV light. Each of these phosphor elements is located in close proximity to a respective liquid crystal cell and is in substantial registry therewith. If the display is a monochrome or single color display, each picture element will include a single phosphor element. If the display is a polychrome or multi-color display, however, each picture element will include as many as three different phosphor elements such as $12_B$, $12_G$ and $12_R$. In the latter event, the colors of the phosphor elements in each pixel may be red, green or blue, as indicated by the subscripts B, G and R or, more generally, any combination of three colors from the CIE chromaticity diagram.

If the display of the invention is a polychrome display, the phosphor elements may be arranged in a variety of ways within each pixel. The phosphors may, for example, have the horizontal linear configuration shown for pixel 12' of FIG. 2, the vertical linear configuration shown for pixel 12'' of FIG. 2 or even the L-shaped configuration shown for pixel 12''' of FIG. 2. Other phosphor configurations such as an equilateral configuration may be used provided that the row and column conductors are not perpendicular or orthogonal to one another. It will be understood that all such configurations are within the contemplation of the present invention.

Figure 3:
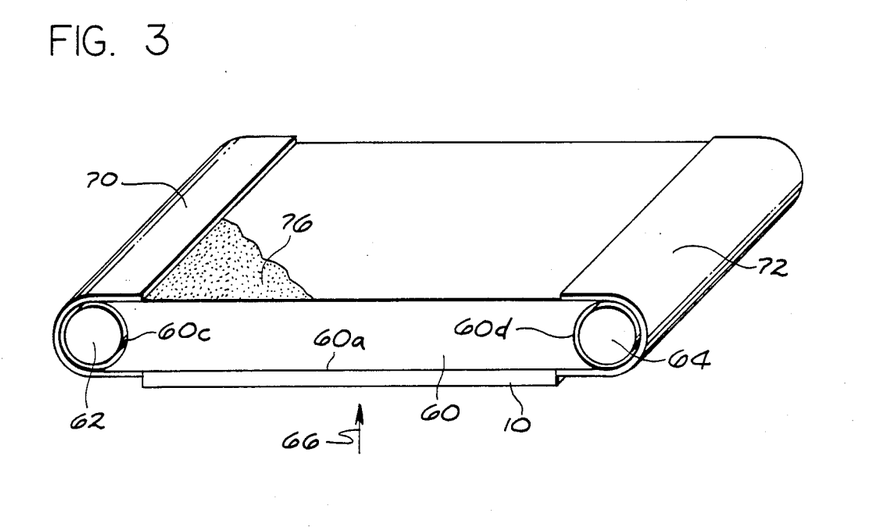
FIG. 3 is a simplified perspective view of the display of FIG. 1.

In accordance with an important feature of the present invention, the pixels of display panel 10 of FIGS. 1 and 2 are illuminated by a UV light pipe assembly, one illustrative embodiment of which is shown in FIG. 3. In the embodiment of FIG. 3, this light pipe assembly includes a UV light transmitting member 60, one or more UV sources 62 and 64, and a liquid crystal assembly 8, the latter being most easily seen in FIGS. 5A–5C. Sources 62 and 64 are preferably mounted adjacent to the edges of member 60 by a conventional mounting arrangement (not shown) to illuminate the interior of the light pipe assembly by multiple internal reflections from the front and rear surfaces thereof. For the sake of clarity, the term "front" will be used herein to refer to that surface of an element which is closer to the viewer of the display, while the term "rear" or "back" will be used to refer to that surface of an element which is further from the viewer. It will be noted in this connection that a viewer will ordinarily view the display from the direction indicated by the arrow 66 of FIG. 3.

As will be explained more fully presently in connection with FIG. 5, the light pipe assembly of FIG. 3 serves as a source of UV light that illuminates or does not illuminate phosphor elements such as 12, depending upon whether the liquid crystal cells that are associated therewith are or are not in their scattered states. Accordingly, it is desirable that the UV light intensity within member 60 be as high as possible. To the end that this high intensity may be achieved, member 60 and the solid parts of liquid crystal assembly 8 are preferably substantially transparent to UV light having UV wavelengths in the band of wavelengths that is emitted by UV sources 62 and 64. In the preferred embodiment, UV sources 62 and 64 include built-in UV filters which restrict the UV light emitted thereby to near UV wavelengths, e.g., light having wavelengths in the range of 300 to 400 nanometers. Because of these relatively long wavelengths, member 60 and the solid parts of liquid crystal assembly 8 need not be composed of expensive materials, such as quartz, but may instead be composed of inexpensive materials such as ordinary glass and plastics such as polymethylmethacrylates which are sold under the trademark Lucite.

The desired high UV light intensity within member 60 may be enhanced by assuring that the back of member 60 and the front of liquid crystal assembly 8 have surfaces flat enough to assure a high degree of internal reflection therefrom. Surfaces which are flat within a range of ±5 microns over each element of surface area having a diameter of approximately 50 mm, for example, will be adequate for this purpose. The desired high level of UV light intensity may be further enhanced by providing side members 70 and 72 which have reflective inner surfaces that tend to reflect outwardly propagating UV light from sources 62 and 64 back toward the edges of member 60. Finally, the desired light level of UV light intensity within member 60 may be enhanced by providing edges 60c and 60d thereof with a curvature and smoothness which maximizes the amount of UV light which member 60 can receive from sources 62 and 64.

In the preferred embodiment, the rear surfaces 60b of member 60 is provided with a UV opaque backing layer 76 which covers the entire rear surface thereof. This UV opaque layer is desirable because it prevents the escape of UV light which strikes the rear surface and is not completely internally reflected therefrom.

In order to understand how the liquid crystal assembly 8 operates as a part of the light pipe assembly of the invention, it is necessary to understand how light is reflected and/or refracted by the interface between two transparent mediums. Accordingly, this reflection and refraction will first be discussed with reference to FIGS. 4A and 4B. Referring first to the ray diagram of FIG. 4A, there is shown the effect which the interface $I_1$ between a dense medium $M_1$ such as glass and a less dense medium $M_2$ such as air has on light rays which eminate from a point P within the glass and which strike interface $I_1$ at various angles. In accordance with conventional usage, the angles formed by all rays are measured with respect to the normal to the interface at the point of incidence.

If the ray is a ray such as $R_1$ which strikes interface $I_1$ at a relatively small angle of incidence $\theta_1$, part of the ray will be reflected from interface $I_1$ at an angle of reflection $\theta_3$ which is equal to angle of incidence $\theta_1$, and part of ray $R_1$ will be transmitted through interface $I_1$ at an angle of refraction $\theta_2$. This angle of refraction is dependent upon the index of refraction $n_{21}$ of medium 2 with respect to medium 1, which index is given by the relationship shown in equation 1 of FIG. 4A. Because medium $M_2$ is less dense than medium $M_1$, the index of refraction $n_{21}$ will be less than 1, and the angle of refraction $\theta_2$ will be greater than angle of incidence $\theta_1$.

Figure 4A:
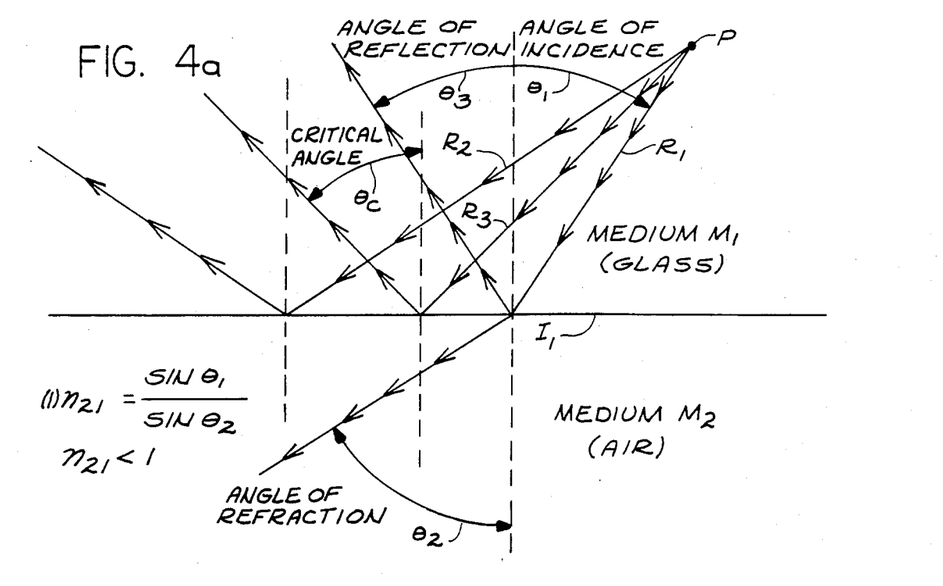
FIGS. 4A and 4B are diagrams which illustrate the reflective and refractive relationships which are employed by the present invention.

If, on the other hand, the ray is a ray such as $R_2$ which strikes the interface at a relatively large angle, substantially all of the ray will be reflected from the interface, a result known as complete internal reflection. Naturally, this complete internal reflection will occur only if the surface of interface $I_1$ is relatively smooth and is free of particles which tend to scatter the ray $R_2$.

Between rays $R_1$ and $R_2$, however, there will always be a ray such as $R_3$ which strikes the interface at an angle which is just great enough to assure complete internal reflection therefrom. This angle of incidence is referred to the critical angle $\theta_c$. Thus, by definition, all rays which strike an interface such as that of FIG. 4A at an angle that is equal to or greater than the critical angle will be completely internally reflected thereby.

Figure 4B:
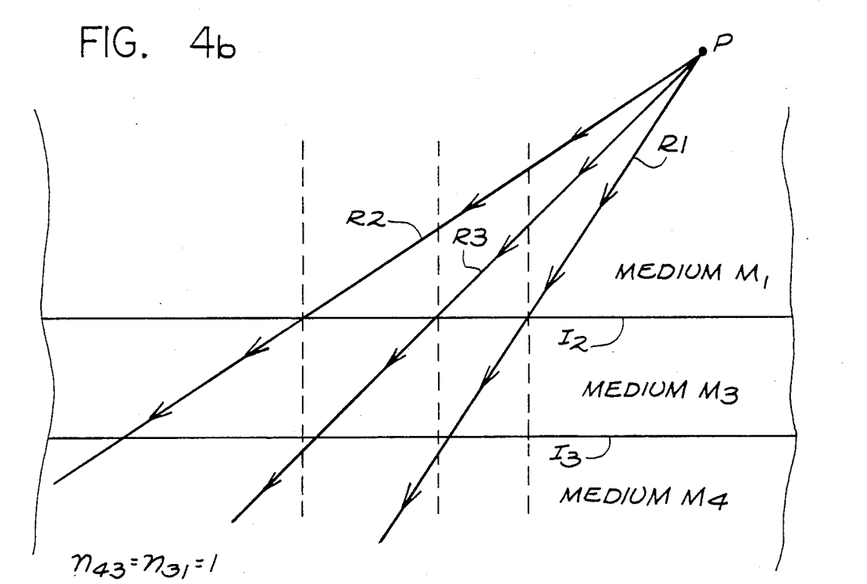

Referring to FIG. 4B there is shown a ray diagram which is generally similar to that of FIG. 4A, except that it includes a plurality of interfaces $I_2$ and $I_3$ between three mediums $M_1$, $M_3$ and $M_4$ which have indices of refraction which are approximately equal to one another. Stated differently, the indices of refraction of mediums $M_3$ and $M_4$ with respect to each other and with respect to medium $M_1$ are all equal to 1. Because of the equality of these indices of refraction, rays $R_1$ through $R_3$ are completely transmitted through interfaces $I_2$ and $I_3$, substantially without regard to the angles of incidence thereon. As a result, complete transmission will occur through interfaces $I_2$ and $I_3$ even if interfaces $I_2$ and $I_3$ are not particularly flat, provided only that the interfaces are free of air gaps and scattering centers.

Figure 5A:
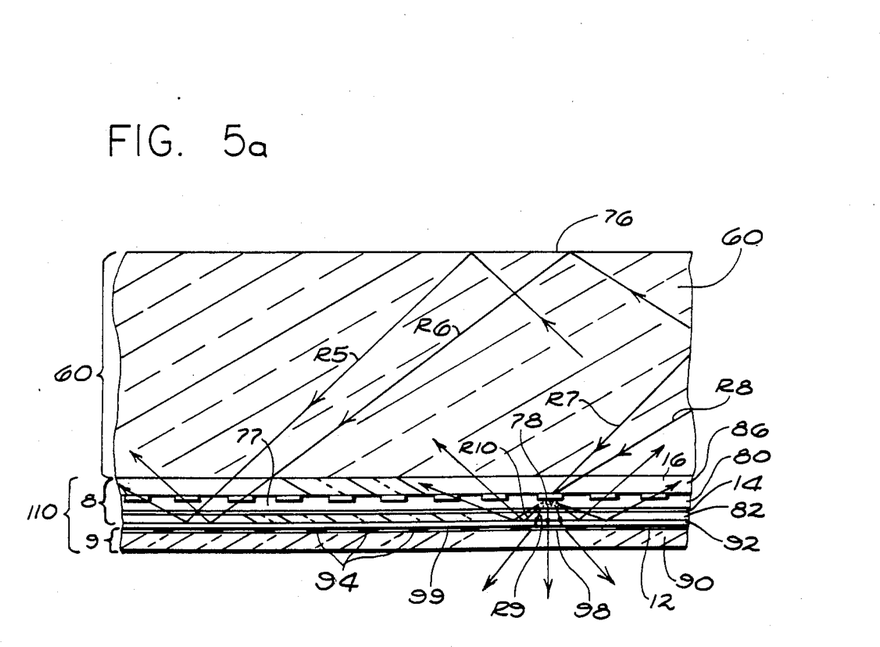
FIGS. 5A, 5B and 5C are enlarged partial cross-sectional views of three different embodiments of the display of the invention.

The manner in which the above described properties are used to produce the results contemplated by the present invention will now be described with reference to FIGS. 5A through 5C. Referring first to FIG. 5A, there is shown a greatly enlarged cross-sectional view of a portion of the preferred embodiment of the light pipe assembly of the invention. This light pipe assembly includes light transmitting member 60, liquid crystal assembly 8, the latter being shown at a scale large enough to show the internal structure thereof. Associated with this light pipe assembly is a viewing screen 9 which, together with liquid crystal assembly 8, forms display panel 10 of FIG. 3. Also shown in FIG. 5A are representative rays $R_5$ and $R_6$ which impinge on a liquid crystal cell 77 that is in its clear or non-scattered state, and representative rays $R_7$ and $R_8$ which impinge on a liquid crystal cell 78 which is in its scattered state.

In the embodiment of FIG. 5A liquid crystal assembly 8 includes a layer of liquid crystal material 80, an array of transparent row electrodes 14 and an array of transparent column electrodes 16 which are supported on opposite sides of layer 80. Row electrodes 14, for example, are supported on a UV transparent glass front plate 82, while column electrodes 16 are supported on a UV transparent glass rear plate 84. In order to assure a high degree of UV light transmission between member 60 and liquid crystal assembly 8, rear plate 84 is optically bonded to member 60 by a layer 86 of a suitable optical cement such as optical adhesive number 68 manufactured by Norland Corporation. In addition, the compositions of plates 82 and 84, and the liquid crystal material (in its clear state) are chosen so that their indices of refraction are approximately equal to one another. This equality assures that rays such as $R_5$ and $R_6$ which are transmitted along member 60 by internal reflection and encounter only cells that are in their clear states are substantially completely internally reflected from the front surface of front plate 82 without being appreciably reflected or otherwise affected by the interface between rear plate 84 and member 60, the interface between layer 80 and rear plate 84, or the interface between layer 80 and front plate 82. As a result, liquid crystal assembly 8 behaves as if it were an integral part of member 60, at least in those parts of the liquid crystal layer which are in their clear states. Stated differently, light transmitting member 60 and liquid crystal assembly 8 together effectively comprise a light pipe which has a layer of liquid crystal material formed within it.

In the embodiment of FIG. 5A viewing screen 9 includes a glass plate 90 having an array of phosphor elements 12 disposed on the rear surface thereof. Viewing screen 9 also includes a UV opaque blocking layer 94 which substantially occupies the spaces between the phosphor elements. Viewing screen 9 is preferably positioned in close proximity to the front surfaces of front plate 82 of liquid crystal assembly 8, each phosphor element being associated with a respective liquid crystal cell and being located in substantial registry therewith. In addition, viewing screen 9 is preferably separated from liquid crystal assembly 8 by a narrow air gap 92 which, though not essential to the operation of the invention, improves the contrast ratio of the display provided thereby.

The operation of the embodiment of FIG. 5A will now be described. As stated earlier, those rays such as $R_5$ and $R_6$ which are incident on liquid crystal cells such as 77 which are in their clear states are transmitted in non-scattered form and are therefore completely internally reflected froom the front surface of front plate 82 of liquid crystal assembly 8. Because of this complete internal reflection, no UV radiation is able to strike the associated phosphor elements. As a result, the phosphor elements that are associated with cleared cells do not provide any visible illumination and do not therefore form a part of the image to be displayed.

Those rays such as $R_7$ and $R_8$ which are incident on liquid crystal cells such as 78 which are in their scattered states, however, are transmitted in scattered form. these scattered rays are propagated in all directions, substantially without regard to the direction or angle at which the rays which gave rise thereto originally struck the scattered cell. Those of the scattered rays such as $R_9$ which strike the front surface of front plate 82 at an angle less than the critical angle are transmitted through that surface, cross air gap 92, and strike the associated phosphor element 98 to produce an illuminated dot on the display. Those of the scattered rays such as $R_{10}$ which strike the front surface of front plate 82 at an angle greater than the critical angle, however, are completely internally reflected from that surface and thereby directed back into the interior of the light pipe assembly. Because the latter rays do not cross the front surface of plate 82, they do not illuminate phosphor elements such as 99 which are adjacent to phosphor element 98. It will therefore be seen that the display of FIG. 5A is arranged to illuminate those phosphor elements and only those phosphor elements which are associated with liquid crystal cells which are in their scattered states.

In order to assure that the above described results are achieved, it is desirable that each phosphor element be located as close as possible to the associated liquid crystal cell and as far as possible from non-associated liquid crystal cells. The former relationship is established by making front plate 82 and air gap 92 as thin as is practicable, while the latter relationship is established by spacing the phosphor elements as far apart as possible in the surface of viewing screen 90. Together, these relationships assure that those scattered rays which emerge from a liquid crystal cell in the direction of non-associated phosphor elements strike the front surface of front plate 82 at an angle equal to or greater than the critical angle for internal reflection therefrom.

The above described results are also improved by the presence of UV blocking layer 94 in the spaces between the phosphor elements. This is because blocking layer 94 absorbs any scattered rays which are transmitted past the edges of the phosphor elements to be illuminated, but which strike the front surface of plate 82 at angles which are less than the critical angle.

In view of the foregoing, it will be seen that the thickness of the front plate of the liquid crystal assembly, cell, the sizes and spacings of the phosphor elements, and blocking layer 94 all cooperate to assure that those phosphor elements and only those phosphor elements that are associated with liquid crystal cells that are in their scattering states are illuminated to form the image to be displayed.

Figure 5B:
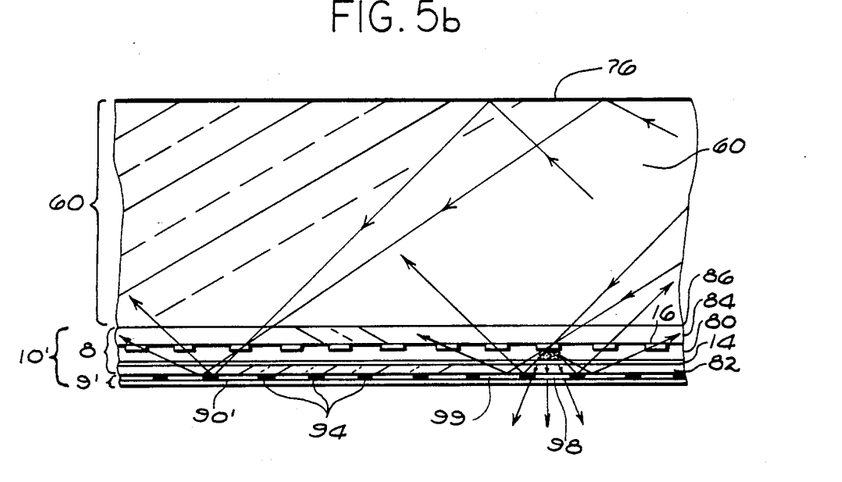

FIG. 5B shows an enlarged cross-sectional view of an alternative embodiment of a display that has been constructed in accordance with the present invention. This embodiment is generally similar to that of FIG. 5A, like functioning parts being similarly numbered. The embodiment of FIG. 5B differs from that of FIG. 5A, however, in that the phosphor elements and the blocking layer of the embodiment of FIG. 5B are deposited directly on the front surface of front plate 82 of liquid crystal assembly 8. The embodiment of FIG. 5B also differs from that of FIG. 5A in that the protective function of glass plate 90 of FIG. 5A is served by a transparent protective coating 90' which may be applied in liquid form and thereafter allowed to harden. It will therefore be seen that the embodiment of FIG. 5B includes a viewing screen 9' which is integral with liquid crystal assembly 8.

In spite of the absence from the display of FIG. 5B of an air gap corresponding to air gap 92 of the display of FIG. 5A, the display of FIG. 5B operates in the manner described in connection with the display of FIG. 5A to illuminate those phosphor elements and only those phosphor elements which are associated with liquid crystal cells which are in their scattered states. The display of FIG. 5B has, however, been found to provide a lower contrast ratio and to be less durable than the display of FIG. 5A. It does not therefore constitute the preferred embodiment of the present invention.

Figure 5C:
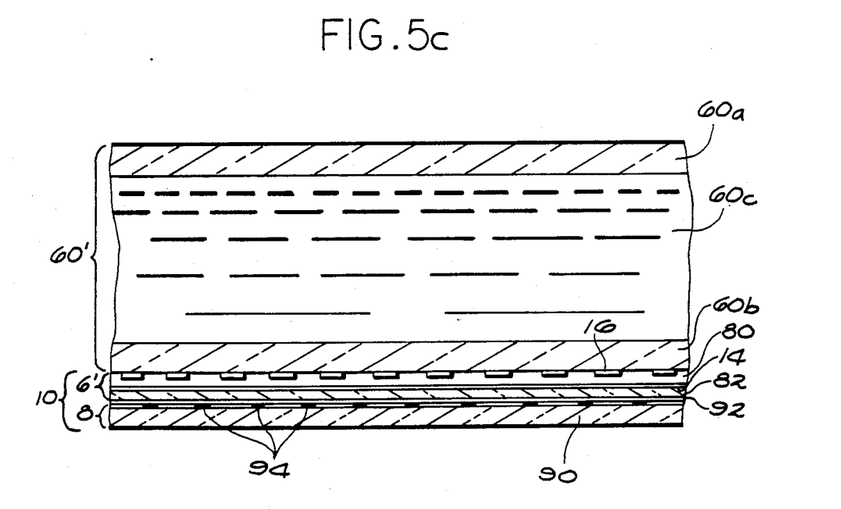

FIG. 5C shows an enlarged cross-sectional view of still another embodiment of the present invention. The embodiment of FIG. 5C is generally similar to that of FIG. 5A, like functioning parts being similarly numbered. The embodiment of FIG. 5C differs from that of FIG. 5A in two respects. Firstly, the liquid crystal assembly 8' of FIG. 5C does not includes a separate rear plate for supporting rear electrodes 16. Instead, the rear electrodes are deposited directly on the front surface of light transmitting member 60' thereof.

Secondly, the embodiment of FIG. 5C includes a light transmitting member 60' which has a three-piece rather than a single piece structure. More particularly, light transmitting member 60' of the embodiment of FIG. 5C includes relatively thin front and rear plates 60a and 60b which are separated by a layer 60c of a suitable UV transparent liquid such as mineral oil. Liquid layer 60c may, for example, be sealed between glass front and rear plates by suitable end seals not shown. Equivalently, layer 60c may be confined in within a glass vessel which has been blown into the desired shape using conventional glass blowing techniques and then polished on its front and rear surfaces. Front and rear plates 60a and 60b may also be composed of a suitable plastic material. The principal advantage of using a liquid-filled light transmitting member is that such a member both weighs and costs less than a solid light transmitting member of similar size.

While the present invention has been described with reference to a number of specific embodiments, it will be understood that the present invention is not limited thereto, and that the true spirit and scope of the present invention should be determined with reference to the following claims.

What is claimed is:

1. A fluorescent liquid crystal display, comprising:
(a) an ultraviolet light source;
(b) an ultraviolet transparent light pipe assembly having substantially planar front and rear surfaces and at least one side surface, said front and rear surfaces being sufficiently flat to substantially totally internally reflect ultraviolet light rays that are incident on said front and rear surfaces at angles greater than the critical angles of said surfaces, whereby at least a substantial part of the ultraviolet light entering said assembly through said side surface is distributed throughout the interior of said assembly as a result of multiple internal reflections from said front and rear surfaces;
(c) means for mounting said ultraviolet source adjacent to said side surface to illuminate the interior of the light pipe assembly;
(d) a layer of liquid crystal material disposed within the light pipe assembly;
(e) a plurality of transparent column electrodes supported on one side of said layer;
(f) a plurality of transparent row electrodes supported on the other side of said layer;
(g) the volumes of liquid crystal material lying between the row and column electrodes defining a plurality of cells, the material in each cell having a clear state in which ultraviolet light is transmitted in substantially non-scattered form and strikes the front surface of the light pipe assembly at an angle which is greater than the critical angle of that surface, and a scattered state in which ultraviolet light is transmitted in substantially scattered form;
(h) a plurality of discrete phosphor elements for emitting visible light in response to exposure to ultraviolet light, said elements being positioned in proximity to the front surface of the light pipe assembly, in substantial registry with respective cells, and having sizes and spacings such that visible light is emitted by substantially only those phosphor elements which are in registry with cells that are in their scattered states; and (i) drive means connected to the row and column electrodes for controlling the states of the cells and thereby causing the phosphor elements to form an illuminated image.

2. The display of claim 1 in which the phosphor elements are grouped into sets, each set including up to three adjacent phosphor elements for emitting visible light in different respective colors.

3. The display of claim 1 including an ultraviolet blocking layer occupying the spaces between the phosphor elements.

4. The display of claim 1 in which the light pipe assembly includes a plurality of ultraviolet transparent plates, said plates having indices of refraction which are approximately equal to one another.

5. The display of claim 4 in which one of the plates has a thickness which is substantially greater than that of the other plates, and in which the ultraviolet source illuminates the interior of the light pipe assembly by illuminating at least one side surface of said one plate.

6. A fluorescent liquid crystal display, comprising:
(a) an ultraviolet light source;
(b) an ultraviolet light transmitting member having generally planar front and rear surfaces and at least one side surface, said front and rear surfaces being sufficiently flat to substantially totally internally reflect ultraviolet light rays that are incident on said front and rear surfaces at angles greater than the critical angles of said surfaces, whereby at least a substantial part of the ultraviolet light entering said member through said side surface is distributed throughout the interior of said member as a result of multiple internal reflections from said front and rear surfaces;
(c) means for mounting the ultraviolet source adjacent to said side surfaces to illuminate the interior of the light transmitting member;
(d) a liquid crystal assembly including:
(i) a layer of liquid crystal material including a front surface and a back surface,
(ii) an array of transparent column electrodes located along one surface of said layer,
(iii) an array of transparent row electrodes located along the opposite surface of said layer, and
(iv) an ultraviolet transparent front plate in contact with the front surface of said layer;
(e) the volumes of liquid crystal material between the column electrodes and the row electrodes defining a plurality of cells, the liquid crystal material in each cell having a clear state in which ultraviolet light is transmitted in substantially non-scattered form and strikes the front surface of the front plate at an angle which is greater than the critical angle thereof, and a scattered state in which ultraviolet light is transmitted in substantially scattered form;
(f) a viewing screen having an inner surface located in close proximity to said front plate and an outer surface;
(g) a plurality of discrete phosphor elements supported on said inner surface for emitting visible light in response to exposure to ultraviolet light, said phosphor elements being associated with respective cells and having sizes and spacings such that visible light is emitted substantially only by those phosphor elements which are associated with cells that are in their scattered states; and
(h) drive means connected to the roow and column electrodes for controlling the states of the cells and thereby causing the phosphor elements to form an illuminated image.

7. The display of claim 6 in which the phosphor elements are grouped into sets, each set including up to three adjacent phosphor elements for emitting visible light in different respective colors.

8. The display of claim 6 including an ultraviolet opaque blocking layer occupying the spaces between the phosphor elements.

9. The display of claim 6 in which the liquid crystal assembly includes an ultraviolet transparent rear plate having an index of refraction which is approximately equal to that of the light transmitting member, and in which the rear plate is cemented to the light transmitting member by an ultraviolet transparent cement.

10. A fluorescent liquid crystal display, comprising:
(a) an ultraviolet light source;
(b) an ultraviolet light transmitting member having generally planar front and rear surfaces and at least one side surface, said front and rear surfaces being sufficiently flat to substantially totally internally reflect ultraviolet light rays that are incident on said front and rear surfaces at angles greater than the critical angles of said surfaces, whereby ultraviolet light entering said member through said side surface is distributed throughout the interior of said member as a result of multiple internal reflections from said front and rear surfaces;
(c) means for mounting said ultraviolet source adjacent to said side surface to illuminate the interior of the light transmitting member;
(d) a liquid crystal assembly including:
(i) a layer of liquid crystal material having a front surface and a back surface,
(ii) a plurality of transparent column electrodes located along one surface of said layer,
(iii) a plurality of transparent row electrodes located along the opposite surface of said layer, and
(iv) a transparent front plate in contact with the front surface of said layer;
(e) the volumes of liquid crystal material lying between the row and column electrodes defining a plurality of cells, the material of each cell having a clear state in which ultraviolet light is transmitted in substantially non-scattered form and strikes the front surface of the front plate at an angle which is greater than the critical angle thereof, and a scattered state in which ultraviolet light is transmitted in substantially scattered form;
(f) a plurality of discrete phosphor elements supported on the front surface of the front plate for emitting visible light in response to exposure to ultraviolet light, said phosphor elements having sizes and spacings such that visible light is emitted by substantially only those phosphor elements which are associated with cells that are in their scattered states;
(g) a transparent protective layer positioned in front of the phosphor elements; and
(h) drive means connected to the row and column electrodes for controlling the states of the cells and thereby causing the phosphor elements to form an illuminated image.

11. The display of claim 10 in which the phosphor elements are grouped into sets, each set including up to three adjacent phosphor elements for emitting visible light in different respective colors.

12. The display of claim 10 including an ultraviolet opaque blocking layer occupying the spaces between the phosphor elements.

13. The display of claim 10 in which the liquid crystal assembly includes an ultraviolet transparent rear plate having an index of refraction which is approximately equal to that of the light transmitting member, and in which the rear plate is cemented to the light transmitting member by an ultraviolet transparent cement.

14. A fluorescent liquid crystal display, comprising:
(a) an ultraviolet light source;
(b) a layer of liquid crystal material;
(c) a plurality of transparent column electrodes supported on one side of said layer;
(d) a plurality of transparent row electrodes supported on the opposite side of said layer;
(e) the volumes of liquid crystal material lying between the row and column electrodes defining a plurality of cells, each cell having a clear state in which ultraviolet light is transmitted through said layer in substantially non-scattered form and a scattered state in which ultraviolet light is transmitted through said layer in substantially scattered form;
(f) a plurality of discrete phosphor elements for emitting visible light in response to exposure to ultraviolet light, said elements being positioned in close proximity to and substantial registry with respective ones of said cells, and having sizes and spacings such that no substantial portion of the ultraviolet light transmitted by cells which are in their scattered states is incident on phosphor elements that are associated with cells which are in their non-scattered states;
(g) ultraviolet light distributing means, having substantially planar front and rear surfaces and at least one side surface, for directing ultraviolet light from the ultraviolet source, through the liquid crystal layer, toward the phosphor elements, said front and rear surfaces being sufficiently smooth to substantially totally internally reflect ultraviolet light rays that are incident thereon at angles greater than the critical angles thereof, whereby at least a substantial part of the ultraviolet light entering the distributing means through said side surface propagates through the interior of the distributing means by multiple internal reflections from said front and rear surfaces;
(h) means for mounting the ultraviolet source adjacent to said side surface; and
(i) drive means connected to the row and column electrodes for controlling the states of said cells;
(j) wherein ultraviolet light rays which are transmitted through cells that are in their non-scattered states strike said front surface at angles which are greater than the critical angle thereof, and wherein at least a substantial portion of the ultraviolet light rays which are transmitted through cells that are in their scattered states strike said front surface at angles which are less than the critical angle thereof.

* * * * *